(12) United States Patent
Uchiyama

(10) Patent No.: US 7,072,268 B2
(45) Date of Patent: Jul. 4, 2006

(54) OPTICAL PICKUP APPARATUS, OPTICAL DISK APPARATUS, AND TRACKING ERROR SIGNAL DETECTION METHOD

(75) Inventor: Mineharu Uchiyama, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 471 days.

(21) Appl. No.: 10/456,507

(22) Filed: Jun. 9, 2003

(65) Prior Publication Data

US 2004/0004915 A1    Jan. 8, 2004

(30) Foreign Application Priority Data

Jul. 5, 2002    (JP)    ............... 2002-197209

(51) Int. Cl.
*G11B 7/00*    (2006.01)
(52) U.S. Cl. ............... 369/112.01; 369/44.12; 369/44.41; 369/44.37
(58) Field of Classification Search ............... None
See application file for complete search history.

(56) References Cited

U.S. PATENT DOCUMENTS

| 6,580,670 B1 * | 6/2003 | Kim et al. ............... 369/44.41 |
| 6,775,221 B1 | 8/2004 | Fukumoto |
| 2004/0190398 A1 * | 9/2004 | Sano et al. ............... 369/44.11 |

FOREIGN PATENT DOCUMENTS

| CN | 1301013 A | 8/2004 |
| JP | 58-056236 A | 4/1983 |
| JP | 59-191143 A | 10/1984 |
| JP | 64-072334 A | 3/1989 |
| JP | 2000-187854 | 7/2000 |
| JP | 2001-357545 | 3/2002 |

OTHER PUBLICATIONS

Japanese Office Action dated Feb. 15, 2005 for Appln. No. 2002-197209.
Office Action in Patent Application No. 03149407.2, Patent Law of the People's Republic of China, Sep. 10, 2004.
Japanese Office Action, dated Sep. 21, 2004 for Patent Application No. 2002-197209.
Uchiyama et al., "TPU3510 7.3 mmH Optical Pickup for DVD and CD Recording," Toshiba Review, Jul. 2002, vol. 57, No. 7, pp. 32-34.
Ohsato, "A new tracking servo method, Differential Push-Pull method," Optical Memory Symposium '86, 1986, pp. 127-132.

* cited by examiner

*Primary Examiner*—Mohammad N. Edun
(74) *Attorney, Agent, or Firm*—Pillsbury Winthrop Shaw Pittman, LLP

(57) ABSTRACT

An optical disk apparatus of this invention includes a light source, an objective lens which focuses a laser beam output from the light source onto an optical disk, a hologram which divides an overlap region where, of reflected light components from the optical disk, a 0th-order light component and ±1st-order light components that are symmetrical with respect to the 0th-order light component overlap by the diameter of the 0th-order light component and also divides a non-overlap region where the 0th-order light component and ±1st-order light components do not overlap along the diameter and a radius perpendicular to the diameter, and a photodetector which independently detects reflected light components from the regions divided by the hologram.

4 Claims, 4 Drawing Sheets

OPTICAL PICKUP APPARATUS, OPTICAL DISK APPARATUS, AND TRACKING ERROR SIGNAL DETECTION METHOD

CROSS-REFERENCE TO RELATED APPLICATIONS

This application is based upon and claims the benefit of priority from the prior Japanese Patent Application No. 2002-197209, filed Jul. 5, 2002, the entire contents of which are incorporated herein by reference.

BACKGROUND OF THE INVENTION

1. Field of the Invention

The present invention relates to an optical pickup apparatus which detects reflected light from an optical recording medium. The present invention also relates to an optical disk apparatus having the optical pickup apparatus. The present invention also relates to a tracking error signal detection method of detecting a tracking error signal on the basis of the reflected light detected by the optical pickup apparatus.

2. Description of the Related Art

A push-pull method (PP) is known as a tracking scheme of an optical disk. In PP, since the symmetry shifts due to movement of the objective lens in the tracking direction, an offset is generated. To suppress this offset, the offset amount is electrically canceled while monitoring the moving amount of the objective lens in the tracking direction. A differential push-pull method (DPP) using three beams is also known. Alternatively, a method of driving a hologram integrally with the objective lens is also known.

When the method of monitoring the moving amount of the objective lens in the tracking direction is applied, a position sensor which monitors the moving amount must be arranged in the optical pickup apparatus. Hence, the apparatus becomes bulky and therefore cannot be applied to a small and thin optical pickup for, e.g., a notebook PC. Additionally, the newly required position sensor increases the cost of apparatus.

DPP is a scheme of canceling an offset using three beams. About 80% of laser output light account for a main beam, and about 20% account for a side beam. Hence, this scheme cannot be used in an optical pickup which has no margin in laser output light, as in a recording system. The interval between the main beam and the side beam is about ½ the track pitch. For this reason, this scheme cannot be used in an optical pickup which records on media such as a DVD-RAM and DVD-R having different track pitches.

The method of driving the hologram integrally with the objective lens can effectively be used for a disk such as a DVD-RAM having a high PP signal modulation ratio for a light receiving signal. However, for a disk such as a DVD-R having a low PP signal modulation ratio for a light receiving signal, the Gaussian distribution of the beam on the aperture has a deviation due to a shift of the objective lens, and an offset of PP signal is generated.

BRIEF SUMMARY OF THE INVENTION

An optical pickup apparatus according to an aspect of the present invention comprises a light source, focusing means for focusing a laser beam output from the light source onto an optical disk, dividing means for dividing an overlap region where, of reflected light components from the optical disk, a 0th-order light component and ±1st-order light components that are symmetrical with respect to the 0th-order light component overlap by a diameter of the 0th-order light component and also dividing a non-overlap region where the 0th-order light component and ±1st-order light components do not overlap along the diameter and a radius perpendicular to the diameter, and detection means for independently detecting reflected light components from the regions divided by the dividing means.

An optical disk apparatus according to an aspect of the present invention is an optical disk apparatus which executes at least one of recording processing of recording information on an optical disk and playback processing of playing back the information recorded on the optical disk and comprises a light source, focusing means for focusing a laser beam output from the light source onto an optical disk, dividing means for dividing an overlap region where, of reflected light components from the optical disk, a 0th-order light component and ±1st-order light components that are symmetrical with respect to the 0th-order light component overlap by a diameter of the 0th-order light component and also dividing a non-overlap region where the 0th-order light component and ±1st-order light components do not overlap along the diameter and a radius perpendicular to the diameter, detection means for independently detecting reflected light components from the regions divided by the dividing means, and tracking control means for generating a tracking error signal on the basis of the reflected light detected by the detection means and controlling tracking on the basis of the tracking error signal.

A tracking error signal detection method according to an aspect of the present invention comprises independently detecting reflected light components from divided regions obtained by dividing an overlap region where, of reflected light components from an optical disk, a 0th-order light component and ±1st-order light components that are symmetrical with respect to the 0th-order light component overlap by a diameter of the 0th-order light component and divided regions obtained by dividing a non-overlap region where the 0th-order light component and ±1st-order light components do not overlap along the diameter and a radius perpendicular to the diameter, and generating a tracking error signal on the basis of the detected reflected light components.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

The embodiment of the present invention will be described below with reference to the accompanying drawing.

Figure 1:
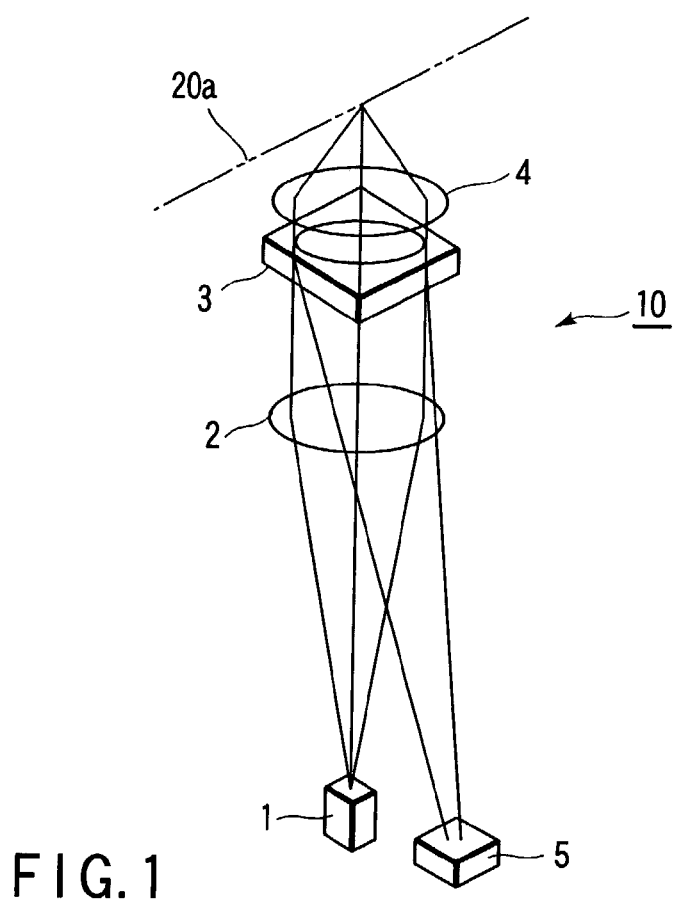
FIG. 1 is a view showing the schematic arrangement of an optical pickup according to an embodiment of the present invention.

FIG. 1 is a view showing the schematic arrangement of an optical pickup according to an embodiment of the present invention. An optical pickup 10 shown in FIG. 1 comprises a light source 1, collimator lens 2, hologram 3, objective lens 4, and photodetector 5.

The optical pickup 10 detects a PP signal from an optical recording medium and detects a tracking error signal using a phase difference detection method (DPD) as in a DVD disk. Examples of the optical recording medium as a PP signal detection object are a disk such as a DVD-RAM which has a high PP signal modulation and a disk such as a DVD-R which has a track pitch greatly different from that of a DVD-RAM and a low PP signal modulation ratio.

A laser beam output from the light source 1 is converted into collimated light by the collimator lens 2. The light is transmitted through the hologram 3 and focused on a pit train 20a of a disk (not shown) through the objective lens 4. Diffracted light from the pit train 20a is converted into collimated light by the objective lens 4 again, diffracted by the hologram 3, and becomes incident on the photodetector 5. The objective lens 4 and hologram 3 are integrally driven.

Figure 2:
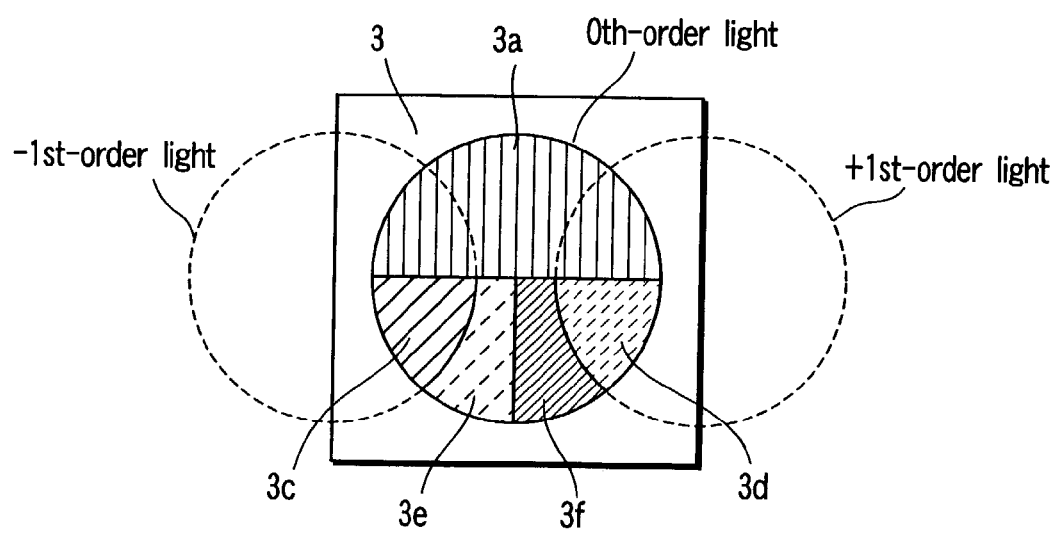
FIG. 2 is a view showing an example of the hologram pattern of a hologram in the optical pickup shown in FIG. 1.
Figure 3:
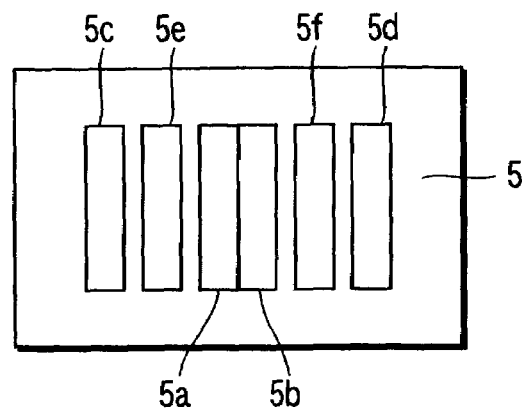
FIG. 3 is a view showing an example of the detection pattern of a photodetector in the optical pickup shown in FIG. 1.

FIG. 2 shows the hologram pattern of the hologram 3. FIG. 3 shows the detection pattern of the photodetector 5. As shown in FIG. 2, the hologram 3 has a 5-division structure having a region 3a, region 3c, region 3d, region 3e, and region 3f. As shown in FIG. 3, the photodetector 5 has a detection region 5a, detection region 5b, detection region 5c, detection region 5d, detection region 5e, and detection region 5f. Reflected light from the region 3a is focused between the detection region 5a and the detection region 5b of the photodetector 5 and used for focus detection using, e.g., a knife-edge method. The region 3c is one of the two regions obtained by dividing a portion of a disk having a low PP signal modulation ratio, where the aperture and −1st-order light direction overlap, into two parts in the tracking direction. In other words, the region 3c is one of the regions where the 0th-order light and −1st-order light overlap in a region obtained by dividing the 0th-order light along the diameter. Similarly, the region 3d is a region obtained by dividing a portion where the aperture and +1st-order light overlap into two parts in the tracking direction. In other words, the region 3d is one of the regions where the 0th-order light and +1st-order light overlap in a region obtained by dividing the 0th-order light along the diameter. The regions 3e and 3f are obtained by dividing a portion except the regions 3a, 3c, and 3d into two parts in the tracking direction. In other words, the region 3e is one of the regions, which is in contact with the region 3c, where the 0th-order light and ±1st-order light do not overlap in one of the regions obtained by dividing the 0th-order light along the diameter. The region 3f is one of the regions, which is in contact with the region 3d, where the 0th-order light and ±1st-order light do not overlap in one of the regions obtained by dividing the 0th-order light along the diameter. Light components diffracted by the regions 3c to 3f become incident on the detection regions 5c to 5f of the photodetector 5.

The output signal from the photodetector 5 is amplified by an amplifier (not shown), so the following signals are output.

VA = 5a
VB = 5b
VC = 5c + 5e
VD = 5d + 5f
VE = 5e
VF = 5f

A focus error signal (FES) is given by FES=VA−VB because the knife-edge method is used. The DPD signal of a DVD disk is output as DPD=phase(VC)−phase(VD). The PP signal of a DVD-RAM disk has a high modulation ratio and therefore is not so largely influenced by an offset according to the shift of the objective lens 4. The PP signal of the DVD-RAM disk is output as PP=VC−VD.

Since the PP signal of a DVD-R has a low modulation ratio, offset is generated by the nonuniform Gaussian distribution on the aperture due to the shift of the objective lens 4. For example, this offset is compensated for by the portions of the regions 3e and 3f.

Figure 4:
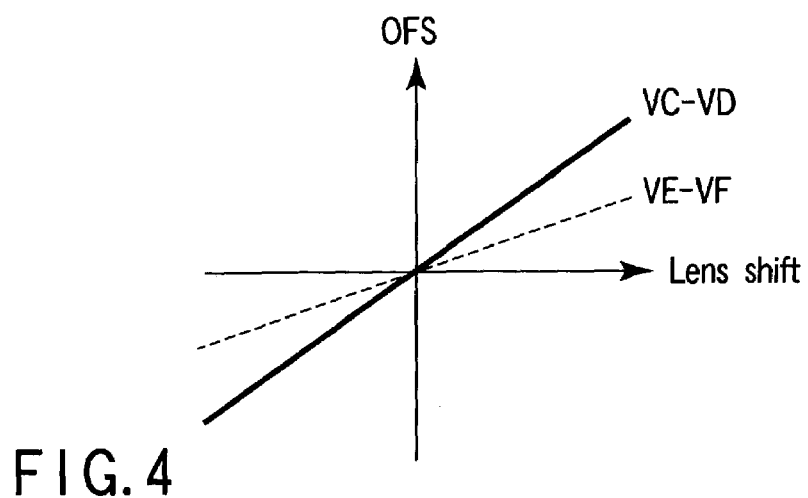
FIG. 4 is a graph showing an example of deviation in the Gaussian distribution on the aperture due to shift of an objective lens in the optical pickup shown in FIG. 1.
Figure 5:
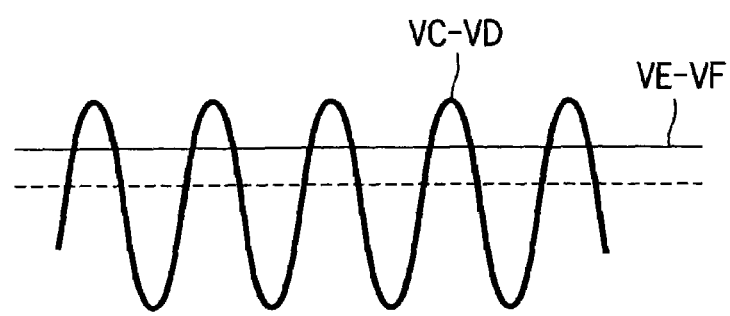
FIG. 5 is a graph showing the relationship between VC–VD and VE–VF.

As shown in FIG. 4, the PP signal, i.e., PP=VC−VD has an offset (OFS) because the Gaussian distribution deviates due to an objective lens shift. On the other hand, the portions of the regions 3e and 3f shown in FIG. 2 also have an offset due to the nonuniform Gaussian distribution. Hence, CPP= (VC−VD)−k(VE−VF). The value $\underline{k}$ is appropriately adjusted. Accordingly, any offset of the PP signal due to a shift of the objective lens can be suppressed. Especially, in this method, since VE and VF are signals of the 0th-order light, they have no PP modulation component. Hence, as shown in FIG. 5, after passing through an LPF for servo signal detection, the signal VE−VF is a DC signal with respect to the PP signal given by VC−VD. The amplitude of the PP signal does not change by calculation of CPP.

With the above arrangement, a satisfactory tracking error signal can be obtained even in a disk having a different track pitch, PP modulation ratio, and tracking error signal detection method.

Figure 8:
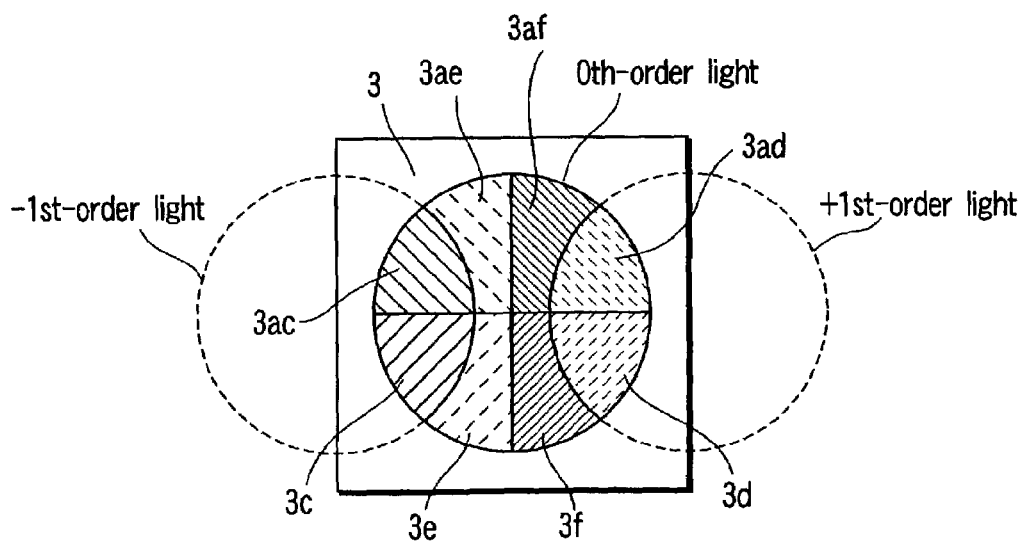
FIG. 8 is a view showing another example (8-division) of the hologram pattern of the hologram in the optical pickup shown in FIG. 1.

In the above description, the half region, i.e., the region 3a of the hologram 3 is used to detect a focusing error. However, a pattern symmetrical to the regions 3c to 3f may be prepared to detect a tracking error signal as a whole. That is, a hologram pattern as shown in FIG. 8 is formed on the hologram 3. That is, the hologram 3 has an 8-division structure having a region 3ac, region 3ad, region 3ae, region 3af, region 3c, region 3d, region 3e, and region 3f. Since the hologram 3 shown in FIG. 8 detects a tracking error signal as a whole, the tracking error signal can be detected more accurately than the hologram shown in FIG. 2. When the hologram 3 shown in FIG. 8 is employed, the photodetector 5 has an arrangement capable of independently detecting reflected light from the eight divided regions of the hologram 3 shown in FIG. 8.

In addition, VC=5c+5e, VD=5d+5f, VE=5e, and VF=5f are calculated by an amplifier (not shown). However, in some disks for recording/playback, VC=5c, VD=5d, VE=5e, and VF=5f may be used to calculate CPP=(VC−VD)−k(VE−VF).

Figure 6:
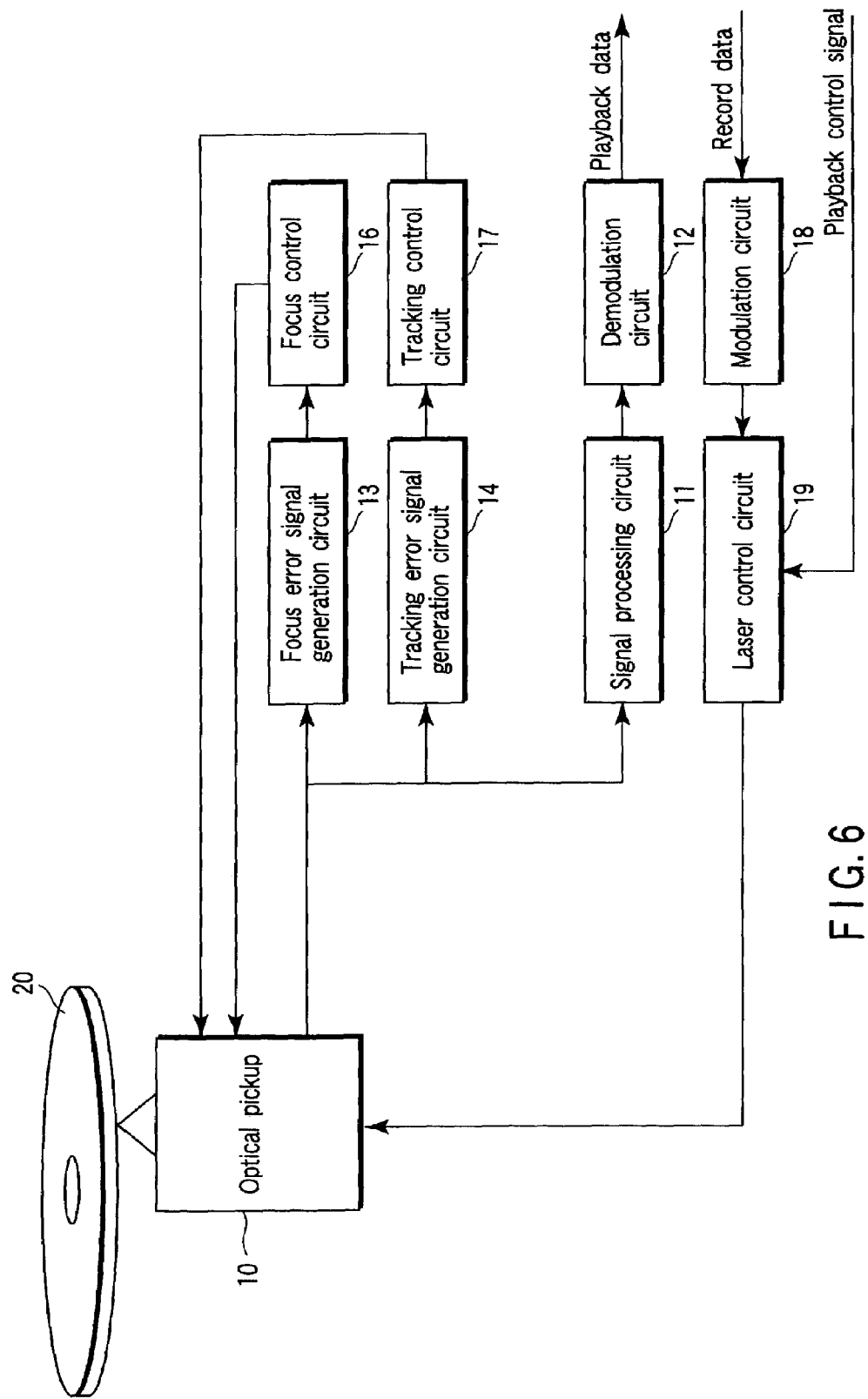
FIG. 6 is a block diagram showing the schematic arrangement of an optical disk apparatus according to the embodiment of the present invention.

An example of an optical disk apparatus to which the optical pickup 10 shown in FIG. 1 is applied will be described next. FIG. 6 is a block diagram showing the schematic arrangement of an optical disk apparatus according to the embodiment of the present invention. This optical disk apparatus records desired data on an optical disk 20 such as a DVD-RAM or DVD-R or plays back data recorded on the optical disk 20.

As shown in FIG. 6, the optical disk apparatus comprises the optical pickup 10, a signal processing circuit 11, demodulation circuit 12, focus error signal generation circuit 13, tracking error signal generation circuit 14, focus control circuit 16, tracking control circuit 17, modulation circuit 18, and laser control circuit 19.

Data recording by this optical disk apparatus will be described first. Record data (data symbol) is modulated into a predetermined channel bit sequence by the modulation circuit 18. The channel bit sequence corresponding to the record data is converted into a laser driving waveform by the laser control circuit 19. The laser control circuit 19 pulse-drives the laser on the light source 1 to record data corresponding to the desired bit sequence on the optical disk 20. A recording light beam radiated from the light source 1 is focused on the information recording surface of the optical disk 20 through the objective lens 4. The focused beam is maintained in a state capable of obtaining the best small spot on the recording surface under focus control by the focus control circuit 16 and tracking control by the tracking control circuit 17.

Data playback by this optical disk apparatus will be described next. On the basis of a data playback instruction, the light source 1 radiates a playback light beam. The playback light beam radiated from the light source 1 is focused on the information recording surface of the optical disk 20 through the objective lens 4. The focused beam is maintained in a state capable of obtaining the best small spot on the recording surface under focus control by the focus control circuit 16 and tracking control by the tracking control circuit 17. At this time, the playback light beam with which the optical disk 20 is irradiated is reflected by a reflecting film or reflective recording film in the information recording surface. The reflected light passes through the objective lens 4 in the reverse direction and becomes incident on the photodetector 5. The light beam incident on the photodetector 5 is photoelectrically converted into an electrical signal and amplified. The amplified signal is equalized and binarized by the signal processing circuit 11 and sent to the demodulation circuit 12. The demodulation circuit 12 demodulates the signal in correspondence with a predetermined modulation scheme and outputs playback data.

As described above, a focus error signal is generated by the focus error signal generation circuit 13 on the basis of the electrical signal output from the photodetector 5. Similarly, a tracking error signal is generated by the tracking error signal generation circuit 14 on the basis of the electrical signal output from the photodetector 5. The focus control circuit 16 controls focus of the beam spot on the basis of the focus error signal. The tracking control circuit 17 controls tracking of the beam spot on the basis of the tracking error signal.

Figure 7:
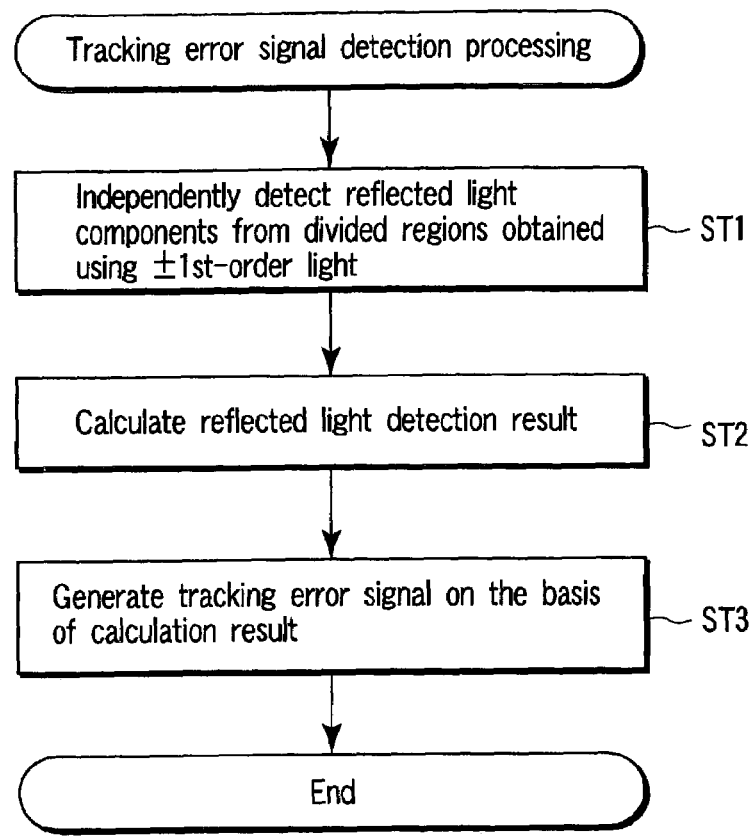
FIG. 7 is a flow chart showing tracking error signal detection processing according to the embodiment of the present invention.

A tracking error signal detection method will be described below with reference to FIG. 7. FIG. 7 is a flow chart showing an outline of tracking error signal detection processing. As already described above, the tracking error signal is generated by the tracking error signal generation circuit 14.

As described above, the reflected light components from the divided regions shown in FIG. 2 are independently detected using the hologram 3 (ST1). More specifically, of the reflected light components from the optical disk 20, reflected light components from the divided regions (regions 3c and 3d) obtained by dividing, along the diameter of the 0th-order light, regions where the 0th-order light component and ±1st-order light components that are symmetrical with respect to the 0th-order light component overlap are detected. Simultaneously, reflected light components from the divided regions (regions 3e and 3f) obtained by dividing, along the diameter and a radius perpendicular to the diameter, a region where the 0th-order light and ±1st-order light do not overlap are detected.

The region 3c is one of regions where the 0th-order light and −1st-order light overlap in a region obtained by dividing the 0th-order light along the diameter. Similarly, the region 3d is one of regions where the 0th-order light and +1st-order light overlap in a region obtained by dividing the 0th-order light along the diameter. The region 3e is one of regions, which is in contact with the region 3c, where the 0th-order light and ±1st-order light do not overlap in one of regions obtained by dividing the 0th-order light along the diameter. The region 3f is one of non-overlap regions, which is in contact with the region 3d, in one of regions obtained by dividing the 0th-order light along the diameter. Reflected light components corresponding to the regions 3c, 3d, 3e, and 3f will be defined as components C, D, E, and F, respectively. (C−D)−k(E−F) (k: coefficient) is calculated (ST2), and a tracking error signal is detected from the calculation result (ST3).

Alternatively, a reflected light component corresponding to the regions 3c and 3e may be defined as the component C, a reflected light component corresponding to the regions 3d and 3f may be defined as the component D, a reflected light component corresponding to the region 3e may be defined as the component E, and a reflected light component corresponding to the region 3f may be defined as the component F. (C−D)−k(E−F) (k: coefficient) may be calculated (ST2), and a tracking error signal may be detected from the calculation result (ST3).

As described above, according to the present invention, a small and thin optical pickup can be provided without increasing the cost. In addition, an optical pickup capable of detecting a satisfactory tracking error signal even in a disk having a different track pitch and PP modulation ratio can be provided.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical disk apparatus which executes at least one of recording processing of recording information on an optical disk and playback processing of playing back the information recorded on the optical disk, comprising:
    a light source;
    a focusing unit configured to focus a laser beam output from the light source onto an optical disk;
    a dividing unit configured to divide an overlap region where, of reflected light components from the optical disk, a 0th-order light component and ±1st-order light components that are symmetrical with respect to the 0th-order light component overlap by a diameter of the 0th-order light component and also divide a non-overlap region where the 0th-order light component and ±1st-order light components do not overlap along the diameter and a radius perpendicular to the diameter;
    a detection unit configured to independently detect reflected light components from the regions divided by the dividing unit; and
    a tracking processing unit configured to generate a tracking error signal on the basis of the reflected light detected by the detection unit and controlling tracking on the basis of the tracking error signal;
    wherein when one of divided regions where the 0th-order light component and the −1 st-order light component overlap in a region obtained by dividing the 0th-order light component along the diameter is defined as a region A, one of divided regions where the 0th-order light component and the +1st-order light component overlap is defined as a region B, a divided region of the non-overlap regions, which is in contact with the region A, is defined as a region C, a divided region of the non-overlap regions, which is in contact with the region B, is defined as a region D, reflected light components corresponding to the regions A, B, C, and D are defined as components a, b, c, and d, respectively, the tracking processing unit generates the tracking error signal on the basis of (a−b)−k(c−d) (k: coefficient), and
    the 0th-order light component and ±1st-order light components are shifted to each other in the tracking direction.

2. An optical disk apparatus which executes at least one of recording processing of recording information on an optical disk and playback processing of playing back the information recorded on the optical disk, comprising:
    a light source;
    a focusing unit configured to focus a laser beam output from the light source onto an optical disk;
    a dividing unit configured to divide an overlap region where, of reflected light components from the optical disk, a 0th-order light component and ±1st-order light components that are symmetrical with respect to the 0th-order light component overlap by a diameter of the 0th-order light component and also divide a non-overlap region where the 0th-order light component and ±1st-order light components do not overlap along the diameter and a radius perpendicular to the diameter;
    a detection unit configured to independently detect reflected light components from the regions divided by the dividing unit; and
    a tracking processing unit configured to generate a tracking error signal on the basis of the reflected light detected by the detection unit and controlling tracking on the basis of the tracking error signal;
    wherein when one of divided regions where the 0th-order light component and the −1 st-order light component overlap in a region obtained by dividing the 0th-order light component along the diameter is defined as a region A, one of divided regions where the 0th-order light component and the +1st-order light component overlap is defined as a region B, a divided region of the non-overlap regions, which is in contact with the region A, is defined as a region C, a divided region of the non-overlap regions, which is in contact with the region B, is defined as a region D, a reflected light component corresponding to the regions A and C is defined as a component a, a reflected light component corresponding to the regions B and D is defined as a component b, a reflected light component corresponding to the region C is defined as a component c, and a reflected light component corresponding to the region D is defined as a component d, the tracking processing unit generates the tracking error signal on the basis of (a−b)−k(c−d) (k: coefficient), and
    the 0th-order light component and ±1st-order light components are shifted to each other in the tracking direction.

3. A tracking error signal detection method comprising:
    independently detecting reflected light components from divided regions obtained by dividing an overlap region where, of reflected light components from an optical disk, a 0th-order light component and ±1st-order light components that are symmetrical with respect to the 0th-order light component overlap by a diameter of the 0th-order light component and divided regions obtained by dividing a non-overlap region where the 0th-order light component and ±1st-order light components do not overlap along the diameter and a radius perpendicular to the diameter; and
    generating a tracking error signal on the basis of the detected reflected light components;
    wherein when one of divided regions where the 0th-order light component and the −1 st-order light component overlap in a region obtained by dividing the 0th-order light component along the diameter is defined as a region A, one of divided regions where the 0th-order light component and the +1st-order light component overlap is defined as a region B, a divided region of the non-overlap regions, which is in contact with the region A, is defined as a region C, a divided region of the non-overlap regions, which is in contact with the region B, is defined as a region D, reflected light components corresponding to the regions A, B, C, and D are defined as components $\underline{a}$, $\underline{b}$, $\underline{c}$, and $\underline{d}$, respectively, the tracking error signal is generated on the basis of $(a-b)-k(c-d)$ (k: coefficient), and the 0th-order light component and ±1st-order light components are shifted to each other in the tracking direction.

4. A tracking error signal detection method comprising:

independently detecting reflected light components from divided regions obtained by dividing an overlap region where, of reflected light components from an optical disk, a 0th-order light component and ±1st-order light components that are symmetrical with respect to the 0th-order light component overlap by a diameter of the 0th-order light component and divided regions obtained by dividing a non-overlap region where the 0th-order light component and ±1st-order light components do not overlap along the diameter and a radius perpendicular to the diameter; and generating a tracking error signal on the basis of the detected reflected light components;

wherein when one of divided regions where the 0th-order light component and the −1st-order light component overlap in a region obtained by dividing the 0th-order light component along the diameter is defined as a region A, one of divided regions where the 0th-order light component and the +1st-order light component overlap is defined as a region B, a divided region of the non-overlap regions, which is in contact with the region A, is defined as a region C, a divided region of the non-overlap regions, which is in contact with the region B, is defined as a region D, a reflected light component corresponding to the regions A and C is defined as a component $\underline{a}$, a reflected light component corresponding to the regions B and D is defined as a component $\underline{b}$, a reflected light component corresponding to the region C is defined as a component $\underline{c}$, and a reflected light component corresponding to the region D is defined as a component $\underline{d}$, the tracking error signal is generated on the basis of $(a-b)-k(c-d)$ (k: coefficient), and the 0th-order light component and ±1st-order light components are shifted to each other in the tracking direction.

* * * * *